US006312821B1

(12) United States Patent
Takasaki et al.

(10) Patent No.: US 6,312,821 B1
(45) Date of Patent: Nov. 6, 2001

(54) COATING STRUCTURE HAVING CORROSION RESISTANCE

(75) Inventors: Norimasa Takasaki; Hiroyuki Murata; Yoshiyuki Matsuda, all of Wako; Morihiro Takemura, Hamamatsu, all of (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 60 days.

(21) Appl. No.: 09/651,691

(22) Filed: Aug. 30, 2000

(30) Foreign Application Priority Data

Sep. 3, 1999 (JP) ........................................ 11-250938

(51) Int. Cl.[7] ........................ B32B 15/04; C23C 22/07

(52) U.S. Cl. .................... 428/472.3; 148/247; 148/253; 148/256; 148/261; 148/272; 148/273; 148/275; 148/276; 148/277; 148/285; 427/402; 428/472; 428/472.1; 428/926

(58) Field of Search ............................ 428/472.3, 623, 428/628, 629, 632, 650, 472.1, 472, 926; 148/247, 253, 256, 261, 272, 273, 275, 276, 277, 285; 427/402

(56) References Cited

U.S. PATENT DOCUMENTS 4,148,670 * 4/1979 Kelly ................................ 148/247

FOREIGN PATENT DOCUMENTS 2250997 10/1990 (JP) .
6-100803-A * 4/1994 (JP) ............................ C09D/5/10
8-60039-A * 3/1996 (JP) ............................ C09D/5/10

* cited by examiner

*Primary Examiner*—Robert R. Koehler
(74) *Attorney, Agent, or Firm*—Adams & Wilks

(57) ABSTRACT

The coating structure having a corrosion resistance of the invention contains a formation film formed on the surface of an aluminum alloy material. The formation film is subjected to a zirconium phosphate treatment. Because the zirconium phosphate reacts with an oxide film on the surface of the aluminum alloy to form a zirconium boehmite layer and to increase the adhesion of the coating material, a corrosion resisting structure is obtained without need of a sealing treatment while restraining the increase of the product cost. Also, a primer layer is formed on the outer surface of the formation film and the primer layer is composed of phosphomolybdic acid.

16 Claims, 2 Drawing Sheets

COATING STRUCTURE HAVING CORROSION RESISTANCE

BACKGROUND OF THE INVENTION

1. Field of the Invention

The present invention relates to a coating structure for improving the corrosion resistance of aluminum alloy-made products and parts used under a water environment, such as marine screws and hulls used on sea water or a lake, water pumps and sprayers having a power such as a general-purpose engine, etc., and agricultural working machines used in a paddy field, etc.

2. Description of the Related Art

To the products and parts described above is applied rust-preventing or corrosion-resisting coating. In particular, rust-preventing coating to sea water containing salinity which is a factor of accelerating corrosion is required.

Concerning rust-preventing or corrosion-resisting coating, many techniques are proposed. For example, Japanese Patent Laid-Open Publication No. HEI-2-250997 discloses a "RUST-PREVENTING TREATMENT METHOD FOR ALUMINUM MATERIAL AND ALUMINUM-MADE OUTBOARD MOTOR FRAME" obtained by forming an anodized film on the surface of a material composed of aluminum or an aluminum alloy and subjecting the anodized film to a sealing treatment with molybdenum disulfide to form thereon a coated film. In the above-mentioned publication, it is described that in the coating structure it is desirable to first coat a primer containing a rust-preventing pigment prior to forming the coated film and also as the rust-preventing pigment which is mixed with the primer, strontium chromate is suitable.

Also, Japanese Patent Laid-Open Publication No. HEI-10-230219 discloses a "COATED FILM STRUCTURE WITH EXCELLENT CORROSION RESISTANCE TO SEAWATER" obtained by forming a formation film on the surface of an aluminum part 11 by a chromate treatment, forming an under coated layer on the surface of the formation film with a rust-preventing pigment coating material using zinc phosphate, and coating thereon a topcoat material.

However, in the coating structure of the Japanese Publication No. HEI-2-250997 described above, a coating anodizing treatment (anodized aluminum treatment) and a sealing treatment are required and these treatments increase the cost, which causes the cost up of the products.

Furthermore, because in the coated film of the Japanese Publication No. HEI-10-230219 described above, zinc phosphate is used, it is anticipated that the strength of the coated film is lowered. If the strength of the coated film is lowered, the corrosion resistance is lowered.

Particularly, because in both Japanese Patent Laid-Open Publication No. HEI-2-250997 and No. HEI-10-230219 described above, a chromic acid treatment or a chromic acid-base primer is used, the treatment of a chromic acid-base waste solution becomes inevitable and the cost for the waste solution treatment becomes a factor of increasing the product cost.

SUMMARY OF THE INVENTION

It is therefore an object of the present invention to provide a coating structure having a sufficient corrosion resistance and capable of restraining the product cost without requiring an anodized film and a sealing treatment.

According to a first aspect of the present invention, there is provided a coating structure having a corrosion resistance, containing an aluminum alloy material, a formation film formed on the surface of the aluminum alloy material by a zirconium phosphate treatment, and a primer layer containing phosphomolybdic acid as a rust-preventing pigment, formed on the outer surface of the formation film.

As described above, according to the invention, because zirconium phosphate reacts with the oxide film of the surface of the aluminum alloy to form a zirconium boehmite layer, which gives the action of increasing the adhesion with a coating material, the corrosion resisting structure can be obtained without requiring a sealing treatment while restraining the increase of the production cost. Furthermore, because phosphomolybdic acid and zirconium phosphate are used, the cost for the water liquid treatment is not increased, whereby the increase of the production cost can be restrained.

As the aluminum alloy, there are, for example, Al—Si—Mg-based alloys. In this case, by allowing the ratio of Cu in the aluminum alloy, the occurrence of corrosion is retrained and by increasing the ratio of Mg in place of lowering Cu, the strength of the product is ensured. Accordingly, by using the above-described aluminum alloy, both the corrosion resistance and the strength can be satisfied.

In the above-described formation film, the weight thereof per unit coated area is in the range of from 5 to 30 mg/m$^2$. When the weight of the formation film described above is less than 5 mg/m$^2$, the film becomes too thin to keep the strength of the film, while when the weight exceeds 30 mg/m$^2$, the films are overlapped each other to lower the adhesion. It is more preferred that the weight of the formation film is in the range of from 20 to 30 mg/m$^2$.

The circumstance differs according to the production method and the working method, in a metal material, unevenness unavoidably forms on the surface thereof. For sufficiently cover the unevenness, as the film thickness of the primer layer, the film thickness of at least 5 $\mu$m becomes necessary. To cover the unevenness, the film thickness is thicker, the better, but because when the thickness exceeds 50 $\mu$m, it becomes uneconomical, it is preferred that the thickness of the primer layer is in the range of from 5 to 50 $\mu$m.

The above-described primer layer is composed of an epoxy resin as the basic resin added with a rust-preventing pigment composed of phosphomolybdic acid. Because an epoxy resin has a high adhesive action, phosphomolybdic acid of the primer layer is strongly adhered to zirconium phosphate of the formation layer, whereby the primer layer can be more strongly adhered to the formation film and the corrosion resistance is more improved.

When the content of the above-described epoxy resin is less than 40% by weight, the intercepting performance of the film is lowered, while the content of the epoxy resin exceeds 60% by weight, the adhesive performance of the film is lowered. Thus, in consideration of both the intercepting performance and the adhesive performance, it is preferred that the ratio of the epoxy resin in the primer is in the range of from 40 to 60% by weight. Furthermore, when the content of phosphomolybdic acid in the primer is less than 5% by weight, the rust-preventing performance is lowered, while the content thereof exceeds 13% by weight, the rust-preventing performance may be sufficient but the adhesive performance is lowered. Therefore, in consideration of both the rust-preventing performance and the adhesive performance, it is preferred that the content of phosphomolybdic acid in the primer is in the range of from 5 to 13% by weight.

By adding the topcoat layer to the formation layer and the primer layer, the whole film thickness of the corrosion resisting coatings is increased to increase the corrosion resistance. For example, even when the thickness of the primer layer may insufficient to some extent, the thickness can be supplemented by adding the topcoat layer. As the coating material constituting the topcoat layer, an acrylic resin-base or melamine-base coating material is preferred. Because an acrylic resin or melamine attaches well to phosphomolybdic acid, the topcoat layer can be strongly adhered to the primer layer.

According to a second aspect of the invention, there is provided a coating structure having a corrosion resistance, containing an aluminum alloy material subjected to a pickling treatment, a formation film formed on the surface of the aluminum alloy material by a zirconium phosphate treatment, and a primer layer using phosphomolybdic acid as a rust-preventing pigment formed on the outer surface of the formation film.

As described above, according to the invention, by applying the pickling treatment to the aluminum alloy before forming thereon the formation film, the attached amount of the formation film can be increased and the corrosion resistance can be more improved. Because zirconium phosphate has the function of reacting with the oxide film of the surface of the aluminum alloy to form a zirconium boehmite layer and to increase the adhesion with the coating material, the corrosion resisting structure can be obtained while restraining the increase of the product cost without need of a sealing treatment. Furthermore, because phosphomolybdic acid and zirconium phosphate are used, the cost for the waste liquid treatment is not increased and the increase of the product cost can be restrained.

BRIEF DESCRIPTION OF THE DRAWINGS

Certain preferred embodiments of the present invention will be hereinafter described in detail, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
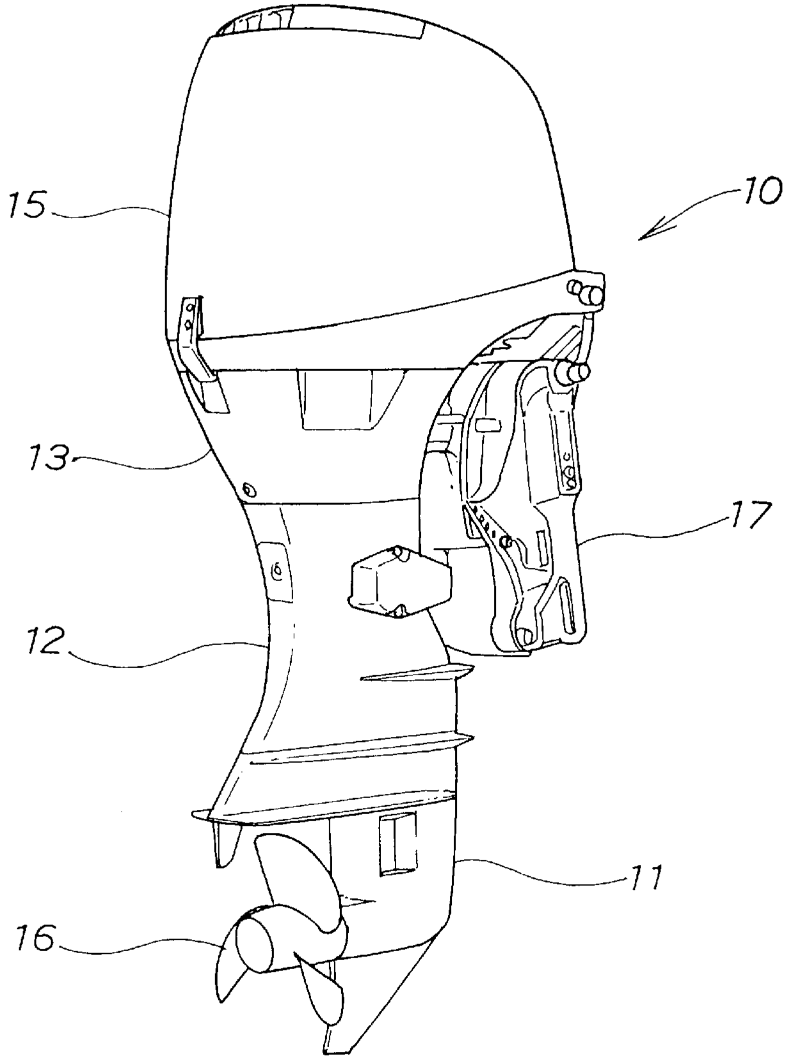
FIG. 1 is a slant view of an outboard motor as an embodiment of the aluminum alloy-made part applied with coating of the invention.

As shown in FIG. 1, an outboard motor 10 has a structure formed by assembling a gear case 11, an extension case 12, an under cover 13, and an engine cover 15. The screw 16 is rotated through an engine, a vertical shaft, and a gear set (not shown) in the engine cover 15. The outboard motor 10 is fitted to the stern (not shown) through a setting bracket 17. The coating of the invention is applied to particularly the gear case 11 and the extension case 12 which are immersed in sea water. As a matter of course, the coating of the invention may be applied to other parts.

That is, the coating of the invention is applied to any aluminum alloy products and parts, which are used under a water environment, irrespective of the kinds, such as marine screws and hulls used on sea water or a lake, water pumps and sprayers having a power such as a general-purpose engine, etc., and agricultural working machines used in a paddy field, etc.

Figure 2:
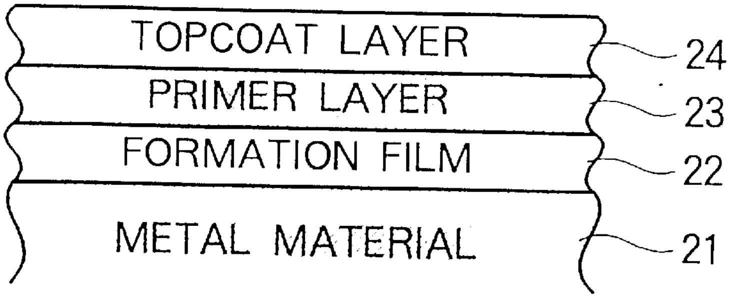
FIG. 2 is block diagram of the coating structure of the invention.

FIG. 2 shows a block diagram of the coating structure of the invention. In FIG. 2, a corrosion resisting coating structure wherein a formation film 22 is formed on a metal material 21, a primer layer 23 is formed on the formation film 22, and a topcoat layer 24 is formed on the primer layer 23 is shown.

For aiming at weight saving, it is preferred that the metal material 21 is an aluminum alloy. In aluminum alloys, an Al—Si—Mg-based alloys added with silicon and magnesium are preferred. In the Al—Si—Mg-based alloy, by adding Mg, a Cu component becomes slight. This is because, by restraining the content of Cu, the corrosion resistance to salinity can be increased.

The formation film 22 is a film formed by chemically, that is by a chemical reaction. In the invention, the film is formed by a zirconium phosphate treatment and the weight the film per unit coated area is in the range of from 5 to 30 mg/m$^2$. The reason is that the weight of the film is less than 5 mg/m$^2$, the film becomes too thin to keep the strength of the film, while the weight exceeds 30 mg/m$^2$, the films are overlapped each other to lower the adhesion. Moreover, because zirconium phosphate is used, the cost of the waste liquid treatment is not increased different from the case of treating a chromic acid waste liquid in prior art.

The primer layer 23 is composed of phosphomolybdic acid as a rust-preventing pigment and a basic resin as the main constituents and it is desirable that the ratio of phosphomolybdic acid in the primer is from 5 to 13% by weight and the ratio of the basic resin is from 40 to 60% by weight. When the content of phosphomolybdic acid is from 5 to 13% by weight, the rust-preventing performance and the adhesion performance can be kept good. The film thickness of the primer layer 23 is from 5 to 50 μm. In a metal material, unevenness unavoidably occurs on the surface thereof although the extent thereof differs according to the production method and the working method of the metal material. For sufficiently cover the unevenness, the film thickness of at least 5 μm becomes necessary. Also, for sufficiently cover the unevenness, the film thickness is thicker, the better, but when the film thickness exceeds 50 μm, it becomes uneconomical.

By forming the topcoat layer 24 on the primer layer, the total film thickness of the corrosion resisting coatings is increased and the corrosion resistance is increased. For example, even when the thickness of the primer layer is insufficient to some extent, this can be supplemented by the addition of the topcoat layer. Also, by adding the topcoat layer on the formation layer and the primer layer, total film thickness of the corrosion resisting coatings is increased and the corrosion resistance is increased.

It is preferred that the coating material constituting the topcoat layer 24 contains an acrylic resin or melamine. This is because an acrylic resin or melamine attaches well to phosphomolybdic acid, whereby the topcoat layer can be strongly adhered to the primer layer.

EXAMPLES

The experimental examples of the present invention are described below but the invention is not limited to these experimental examples.

Because the invention relates to a coating structure having a corrosion resistance, mainly a salt spray test explained below in detail is practiced and by the width of corrosion occurring after a definite time, the corrosion resistance is evaluated.

(1) Salt spray test: According to JIS Z 2371 "salt spray test method", a spraying chamber, an aqueous NaCl solution of 5±0.5%, compressed air of from 68.6 to 177 kPa, and a temperature controller maintaining a temperature to 35±1° C. were prepared, and a salt water is sprayed to a test piece for a definite time under the conditions of a relative humidity of from 95 to 98% and a temperature of 35±1° C.

(2) Test piece (see, FIG. 3A): An aluminum alloy of 70 mm×150 mm×3.0 mm applied with the formation film, the primer layer, etc., and notched in an X form by a cutter knife, and is supplied to the experiment.

(3) Evaluation: The external appearance is visually observed or see FIG. 3B.

Figure 3A:
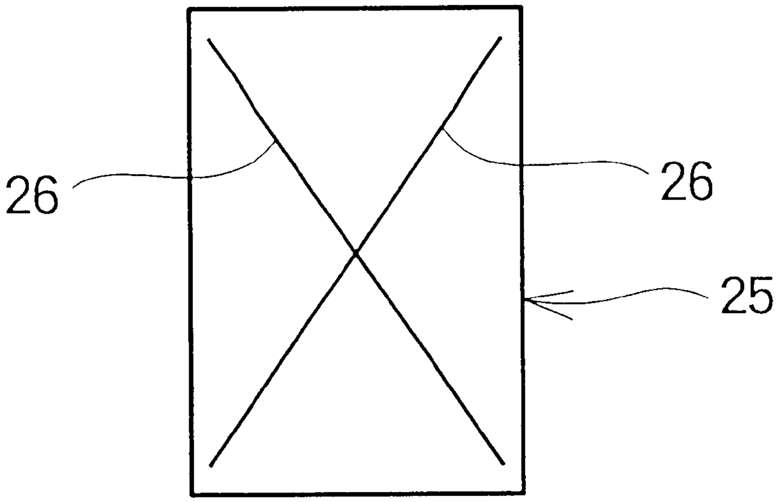
FIG. 3A and FIG. 3B are views explaining a test piece and corroded width respectively.
Figure 3B:
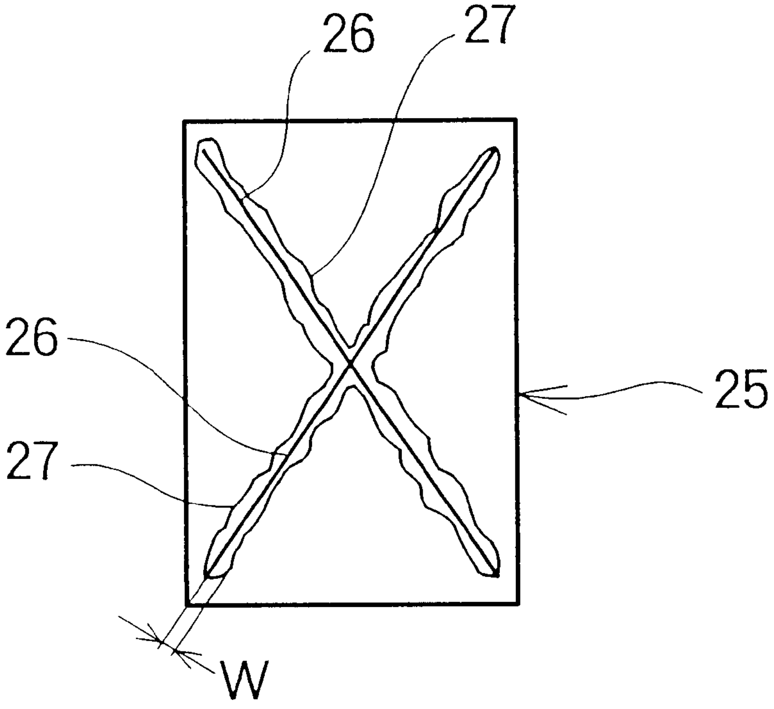

FIG. 3A and FIG. 3B show the views explaining the test piece and the corrosion width.

FIG. 3A shows a test piece 25 of an aluminum alloy applied with the formation film, the primer layer, etc. In the test piece 25, notches 26, 26 are formed by a cutter knife.

FIG. 3B shows the test piece 25 after subjected to the salt spray test for a definite time, which shows the state that corrosions 27, 27 spread with the notches 26, 26 as the starting points. The width W of the corrosion 27 is measured. The width W is the size from the center of the notch 26, which is hereinafter is referred to as "corrosion width".

Experiment Examples 1 to 6

Metal material: JIS ADC3 aluminum alloy.

Formation film: Zirconium phosphate (10 mg/m$^2$) or zinc phosphate (2.1 mg/m$^2$).

Primer layer: Phosphomolybdic acid pigment (25 $\mu$m), zinc phosphate pigment (25 $\mu$m), or tripolyphosphoric acid pigment (25 $\mu$m).

A sample piece obtained by forming the formation film on the above-described metal material and forming the primer layer thereon was notched as described above, and the salt spray test was carried out for 2500 hours. The results are shown in Table 1 below.

TABLE 1

| | Experimental Example 1 | Experimental Example 2 | Experimental Example 3 | Experimental Example 4 | Experimental Example 5 | Experimental Example 6 |
|---|---|---|---|---|---|---|
| Metal material | Aluminum alloy (JIS-ADC3) | | | | | |
| Formation film | Zirconium phosphate | | | Zinc phosphate | | |
| Primer layer | Phosphomolybdic acid | Zinc hate | Tripolyphosphoric acid | Phosphomolybdic acid | Zinc hate | Tripolyphosphoric acid |
| Evaluation | B | C | C | D | D | D |

In Experimental Example 1, the corrosion width W was about 2.0 mm, which was evaluated as B (good).

In Experimental Example 2, the corrosion width W exceeded 2.0 mm, which was evaluated as C (fair). It is considered that the zinc phosphate pigment of the primer layer could not sufficiently react with the formation film (zirconium phosphate), whereby the adhesion was lowered and the corrosion proceeded.

In Experimental Example 3, the corrosion width W exceeded 2.0 mm, which was evaluated as C. It is considered that the tripolyphosphoric acid pigment of the primer layer could not sufficiently react with the formation film (zirconium phosphate), whereby the adhesion was lowered and the corrosion proceeded.

In Experimental Examples 4, 5, and 6, the width W far exceeded 2.0 mm, which was evaluated as D (not good). It is considered that because the formation film was made of zinc phosphate, the zinc phosphate formed a weak bond with phosphomolybdic acid, zinc phosphate, or tripolyphosphoric acid of the primer layer, whereby the rust-preventing performance was greatly lowered.

From the above-described results, it could be confirmed that the combination of the aluminum alloy (metal material), zirconium phosphate (formation film), and phosphomolybdic acid (primer layer) was best.

Experimental Examples 7 to 10

It is well known that on the surface of an aluminum alloy, the oxide film of $Al_2O_3$ exists a barrier layer. However, because the outer surface of the barrier layer is porous, by subjecting such a surface to a "pre-treatment", there is a possibility that increase of the attached amount of the formation film is obtained as compared with the untreated one.

Experimental Examples 7 to 10 are the confirmation tests thereof and are shown in Table 2 below.

TABLE 2

| | Experimental Example 7 | Experimental Example 8 | Experimental Example 9 | Experimental Example 10 |
|---|---|---|---|---|
| Metal material | Aluminum alloy (JIS-ADC3) | | | |
| 1st Pre-treatment | Coarse buffing | Coarse buffing | Shot | Shot |
| 2nd Pre-treatment | Shot | Shot | Coarse buffing | Coarse buffing |
| 3rd Pre-treatment | Pickling | | Pickling | |
| Attached of amount formation film* | 19.4 mg/m$^2$ | 11.7 mg/m$^2$ | 15.4 mg/m$^2$ | 8.6 mg/m$^2$ |
| Evaluation | A | C | B | D |

*Zirconium phosphate film

To the aluminum alloy (JIS-ADC3) were applied course buffing with #180 and a shot with aluminum alloy particles having a particle size of 1.2 mm as pre-treatments in the order or the reversed order and, thereafter, by applying pickling in Experimental Examples 7 and 9 or without applying pickling in Experimental Examples 8 and 10, the formation film made of zirconium phosphate was formed in each case. As the oxidizing agent, phosphoric acid as the main constituent added with hydrofluoric acid and a surface active agent was used.

In Experimental Example 7, the attached amount of the formation film reached 19.4 mg/m$^2$, which was evaluated as A (excellent).

In Experimental Example 8, because pickling was not applied, the attached amount of the formation film was only 11.7 mg/m$^2$, which was evaluated as C.

In Experimental Example 9, because pickling was applied, the attached amount of the formation film reached 15.4 $mg/m^2$, but the result was worse than the result of Experimental Example 7, whereby the case was evaluated as B. This is considered to be the influence of that the pre-treatment was in the order of shot→course buffing.

In Experimental Example 10, because pickling was not applied, the attached amount of the formation film was only 8.6 $mg/m^2$, which was worse than the result of the result of Experimental Example 8, whereby the case was evaluated as D.

From the above-described experimental examples, it was seen that in the case of assuming the a formation film was formed on aluminum alloy, "pickling" as the pre-treatment was effective.

Desirably, it was confirmed that when a coarse buffing and a shot were applied prior to pickling, both the coarse buffing and the shot were applied, the order of the coarse buffing→the shot→pickling was optimum.

Experimental Examples 11 to 13

As aluminum alloys, although the alloys having various components are considered, because from the point of the corrosion resistance after applying coating, the optimum component was determined, the results are shown in Table 3 below.

TABLE 3

| | | Exp. Example 11 | Exp. Example 12 (ADC3 correspondence) | Exp. Example 13 (ADC12 correspondence |
|---|---|---|---|---|
| Components (%) of metal material | Cu | 0.13 | 0.6 | 3.06 |
| | Si | 11.0 | 9.74 | 11.1 |
| | Ma | 0.49 | 0.49 | 0.23 |
| | Al and others | Residue | Residue | Residue |
| Formation film | | Zicronium phosphate (10 $mg/m^2$) | | |
| Primer layer | | Phosphomolybdic acid (25 μm) | | |
| Salt spray test | | 500, 1000, and 2500 hours | | |
| Corrosion width W (mm) | 500 hours | almost 0 | 1.0 to 2.5 | 1.0 to 2.0 |
| | 1000 hours | 0.1 to 1.0 | 1.5 to 2.5 | 2.0 to 2.5 |
| | 2500 hours | 0.3 to 2.0 | 3.0 to 4.0 | 3.5 to 5.0 |
| | Evaluation | A | B | C |

In Experimental Example 11, when the sample obtained by forming a formation film of zirconium phosphate (10 $mg/m^2$) on an Al—Si—Mg-based aluminum alloy of low Cu and high Mg, composed of 0.13% by weight Cu, 11.0% by weight Si, 0.49% by weight Mg, rest being Al and unavoidable components and forming thereon a primer layer of phosphomolybdic acid (25 μm) was applied a salt spray test for a definite time and then the corrosion width was determined, the corrosion width after 2500 hours was only from 0.3 to 2.0 mm, which was evaluated as A.

In Experimental Example 12, when the sample obtained by forming a formation film of zirconium phosphate (10 $mg/m^2$) on a standard Al—Si—Mg-based aluminum alloy (corresponding to JIS-ADC3), composed of 0.6% by weight Cu, 9.74% by weight Si, 0.49% by weight Mg, rest being Al and unavoidable components and forming thereon a primer layer of phosphomolybdic acid (25 μm) was applied a salt spray test for a definite time and then the corrosion width was determined, the corrosion width after 2500 hours was from 3.0 to 4.0 mm and the corrosion proceeded more than Experimental Example 11, whereby the case was evaluated as B.

In Experimental Example 13, when the sample obtained by forming a formation film of zirconium phosphate (10 $mg/m^2$) on a standard Al—Si—Cu-based aluminum alloy (corresponding to JIS-ADC12), composed of 3.06% by weight Cu, 11.1% by weight Si, 0.23% by weight Mg, rest being Al and unavoidable components and forming thereon a primer layer of phosphomolybdic acid (25 μm) was applied a salt spray test for a definite time and then the corrosion width was determined, the corrosion width was from 3.5 to 5.0 mm and the corrosion proceeded more than Experimental Example 12, whereby the case was evaluated as C.

From the experimental examples it could be confirmed that the Al—Si—Mg-based aluminum alloys (Experimental Examples 11 and 12) were excellent in the point of the corrosion resistance as compared with the Al—Si—Cu-based aluminum alloy (Experimental Example 13). Furthermore, it was also confirmed that in the Al—Si—Mg-based aluminum alloys, the aluminum alloy containing less Cu (Experimental Example 11) was more excellent in the corrosion resistance.

Experimental Examples 14 to 20

In the examples, the relation of the attached amount of the formation film (zirconium phosphate) and the corrosion resistance was determined. The contents are shown in Table 4 below.

However, the contents (weight %) of phosphomolybdic acid constituting the primer layer in Table 4 is different from that of Table 3.

TABLE 4

| | Experimental Example 14 | Experimental Example 15 | Experimental Example 16 | Experimental Example 17 | Experimental Example 18 | Experimental Example 19 | Experimental Example 20 |
|---|---|---|---|---|---|---|---|
| Metal material | Aluminum Alloy (JIS-ADC3) | | | | | | |
| Attached amount of formation film | Zirconium phosphate ($mg/m^2$) | | | | | | |
| | 3 | 5 | 15 | 20 | 30 | 35 | 55 |
| Primer layer | Phosphomolybdic acid (25 μm) | | | | | | |
| Width W* (mm) | 1.1 | 0.75 | 0.6 | 0.4 | 0.3 | 1.0 | 1.3 |
| Evaluation | D | B | B | A | A | C | D |

*: Salt spray test for 2500 hours.

In Experimental Example 14, when the attached amount of the formation film (zirconium phosphate) was 3 $mg/m^2$, a primer layer (phosphomolybdic acid of 25 μm) was formed thereon, a salt spray test was applied for 2500 hours, and the corrosion width W was determined, the corrosion width was 1.1 mm and a relatively large corrosion was observed, whereby the case was evaluated as D.

In Experimental Example 15, when the attached amount of the formation film (zirconium phosphate) was 5 $mg/m^2$, a primer layer (phosphomolybdic acid of 25 μm) was formed thereon, a salt spray test was applied for 2500 hours, and the corrosion width W was determined, and the corrosion width W was determined, the corrosion width was 0.75 mm, which was lower than 1.0 mm, whereby the case was evaluated as B.

In Experimental Example 16, when the attached amount of the formation film (zirconium phosphate) was 15 mg/m$^2$ and the corrosion width W was determined, the corrosion width was 0.6 mm which was lower than 1.0 mm, whereby the case was evaluated as B.

In Experimental Example 17, when the attached amount of the formation film (zirconium phosphate) was 20 mg/m$^2$ and the corrosion width W was determined, the corrosion width was 0.4 mm which was lower than 0.5 mm, whereby the case was evaluated as A.

In Experimental Example 18, when the attached amount of the formation film (zirconium phosphate) was 30 mg/m$^2$ and the corrosion width W was determined, the corrosion width was 0.3 mm which was lower than 0.5 mm, whereby the case was evaluated as A.

In Experimental Example 19, when the attached amount of the formation film (zirconium phosphate) was 35 mg/m$^2$ and the corrosion width W was determined, the corrosion width was deteriorated to 1.0 mm, whereby the case was evaluated as C.

In Experimental Example 20, when the attached amount of the formation film (zirconium phosphate) was 55 mg/m$^2$ and the corrosion width W was determined, the corrosion width was deteriorated to 1.3 mm, which exceeded 1.0 mm, whereby the case was evaluated as D.

From the experimental examples it could be seen that the attached amount of the formation film should be in the range of from 5 to 30 mg/m$^2$, and preferably in the range of from 20 to 30 mg/m$^2$.

Experimental Examples 21 to 28

In the experimental examples, the appropriate film thickness of the primer layer (phosphomolybdic acid) was determined. The contents obtained are shown in Table 5 below. However, the contents (weight %) of phosphomolybdic acid constituting the primer layers in Table 5 are different from those of the primer layers in Tables 3 and 4.

TABLE 5

| | Experimental Example 21 | Experimental Example 22 | Experimental Example 23 | Experimental Example 24 | Experimental Example 25 | Experimental Example 26 | Experimental Example 27 | Experimental Example 28 |
|---|---|---|---|---|---|---|---|---|
| Metal material | Aluminum Alloy (JIS-ADC3) | | | | | | | |
| Formation film | Zirconium phosphate (10 mg/m$^2$) | | | | | | | |
| Primer layer | Phosphomolybdic acid ($\mu$m) | | | | | | | |
| | 5 | 10 | 15 | 20 | 25 | 30 | 40 | 50 |
| Width W* (mm) | 1.5 | 1.2 | 1.4 | 1.2 | 1.2 | 1.2 | 1.2 | 1.2 |

*: Salt spray test for 2500 hours.

That is, when the formation film of zirconium phosphate was formed on the aluminum alloy and the primer layer having the thickness of 5, 10, 15, 20, 25, 30, 40 or 50 $\mu$m was formed thereon to prepare each sample and after applying thereto a salt spray test of 2500 hours, the corrosion width was determined, the corrosion widths of all the samples of Experimental Examples 21 to 28 were in the range of from 1.2 to 1.5 mm and remarkable differences were not observed among the samples.

As the results thereof, it can be seen that the preferred film thickness of the primer layer may be determined by other factors than the corrosion resistance. Thus, the thickness of the primer layer is defined to be at least 5 $\mu$m from the point of covering projections such as burrs, etc., existing on the surface of an aluminum alloy material and is defined to be not thicker than 50 $\mu$m from the point of economy.

Experimental Examples 29 to 34

The appropriate ratio of the basic resin (epoxy resin) constituting the primer layer was determined. The results obtained are shown in Table 6 below.

TABLE 6

| | Experimental Example 29 | Experimental Example 30 | Experimental Example 31 | Experimental Example 32 | Experimental Example 33 | Experimental Example 34 |
|---|---|---|---|---|---|---|
| Metal material | Aluminum alloy (JIS-ADC3) | | | | | |
| Formation film | Zirconium phosphate (10 mg/cm$^2$) | | | | | |
| Primer layer | Ratio of epoxy resin (weight %) | | | | | |
| | 20 | 30 | 40 | 50 | 60 | 70 |
| Durability test | Boiling water test of 8 hours | | | | | |
| Appearance | D | D | B | B | B | D |

Each sample prepared by forming the formation film of zirconium phosphate (10 mg/m$^2$) on the aluminum alloy and forming thereon a primer layer having a changed ratio of an epoxy resin, and after forming thereon a lattice form notch of 1 mm square by a cutter knife, the sample was immersed in boiling water for 8 hours.

In Experimental Example 29, the ratio of the epoxy resin was 20% by weight but because as the result of the boiling water test, a blister occurred to deteriorate the appearance, the sample was evaluated as D.

In Experimental Example 30, the ratio of the epoxy resin was 30% by weight but because as the result of the boiling water test, a blister occurred to deteriorate the appearance, the sample was evaluated as D.

In Experimental Example 31, the ratio of the epoxy resin was 40% by weight but as the result of the boiling water test, no abnormality was observed, whereby the sample was evaluated as B.

In Experimental Example 32, the ratio of the epoxy resin was 50% by weight but as the result of the boiling water test, no abnormality was observed, whereby the sample was evaluated as B.

In Experimental Example 33, the ratio of the epoxy resin was 60% by weight but as the result of the boiling water test, no abnormality was observed, whereby the sample was evaluated as B.

In c 34, the ratio of the epoxy resin was 70% by weight but because as the result of the boiling water test, a blister occurred to deteriorate the appearance, the sample was evaluated as D.

Accordingly, the ratio of the epoxy resin in the primer layer is from 40 to 60% by weight in the invention.

Experimental Examples 35 to 42

The appropriate ratio of the rust-preventing pigment (phosphomolybdic acid) constituting the primer layer was determined. The results are shown in Table 7 below.

What is claimed is:

1. A coating structure having a corrosion resistance, comprising an aluminum alloy material;

a formation film formed on the surface of the aluminum alloy material by a zirconium phosphate treatment, and a primer layer containing phosphomolybdic acid as a rust-preventing pigment, formed on the outer surface of the formation film.

2. The coating structure according to claim 1 wherein the aluminum alloy is an Al—Si—Mg-based alloy.

TABLE 7

| | Experimental Example 35 | Experimental Example 36 | Experimental Example 37 | Experimental Example 38 | Experimental Example 39 | Experimental Example 40 | Experimental Example 41 | Experimental Example 42 |
|---|---|---|---|---|---|---|---|---|
| Metal material | Aluminum Alloy (JIS-ADC3) | | | | | | | |
| Formation film | Zirconium phosphate (10 mg/m$^2$) | | | | | | | |
| Primer layer | Ratio of phosphomolybdic acid (weight %) | | | | | | | |
| | 0 | 3 | 5 | 7 | 10 | 13 | 15 | 17 |
| Corrosion width* (mm) | 13 | 8 | 5 | 5 | 4 | 3 | Almost0 | Almost0 |
| Appearance | good | good | good | Good | good | good | bad | bad |
| Evaluation | D | D | B | B | B | B | D | D |

*: Salt spray test of 2000 hours.

Each sample prepared by forming the formation film of zirconium phosphate (10 mg/m$^2$) on the aluminum alloy and forming thereon a primer layer having a changed ratio of phosphomolybdic acid was subjected to salt spray test of 2000 hours, and the corrosion width and the appearance were determined.

In Experimental Example 35, the ratio of phosphomolybdic acid was 0 and the appearance was good but the corrosion width reached 13 mm, whereby the sample was evaluated as D.

In Experimental Example 36, the ratio of phosphomolybdic acid was 3% by weight and the appearance was good but the corrosion width reached 8 mm, whereby the sample was evaluated as D.

In Experimental Example 37, the ratio of phosphomolybdic acid was 5% by weight, the appearance was good and the corrosion width was reduced to 5 mm, whereby the sample was evaluated as B.

In Experimental Example 38, the ratio of phosphomolybdic acid was 7% by weight, the appearance was good and the corrosion width was reduced to 5 mm, whereby the sample was evaluated as B.

In Experimental Example 39, the ratio of phosphomolybdic acid was 10% by weight, the appearance was good and the corrosion width was reduced to 4 mm, whereby the sample was evaluated as B.

In Experimental Example 40, the ratio of phosphomolybdic acid was 13% by weight, the appearance was good and the corrosion width was reduced to 3 mm, whereby the sample was evaluated as B.

In Experimental Example 41, the ratio of phosphomolybdic acid was 15% by weight and the corrosion width was almost 0, but because a blister occurred and the appearance was deteriorated, the sample was evaluated as D.

In Experimental Example 42, the ratio of phosphomolybdic acid was 17% by weight and the corrosion width was almost 0, but because a blister occurred and the appearance was deteriorated, the sample was evaluated as D.

Accordingly, it is desirable that the ratio of phosphomolybdic acid in the primer layer is in the range of from 5 to 13% by weight.

3. The coating structure according to claim 1 wherein the weight of the formation film per unit coated area is from 5 to 30 mg/m$^2$.

4. The coating structure according to claim 3 wherein the weight of the formation film per unit coated area is from 20 to 30 mg/m$^2$.

5. The coating structure according to claim 1 wherein the film thickness of the primer layer is from 5 to 50 $\mu$m.

6. The coating structure according to claim 1 wherein the primer layer comprising an epoxy resin as a basic resin added with a rust-preventing pigment made of phosphomolybdic acid.

7. The coating structure according to claim 6 wherein the ratio of the epoxy resin in the primer is from 40 to 60% by weight and the ratio of phosphomolybdic acid in the primer is from 5 to 13% by weight.

8. The coating structure according to claim 1 wherein a topcoat layer is formed on the outer surface of the primer layer and the coating material constituting the topcoat layer is an acrylic resin-base or melamine-base coating material.

9. A coating structure having a corrosion resistance, comprising an aluminum alloy material subjected to a pickling treatment;

a formation film formed on the surface of the aluminum alloy material by a zirconium phosphate treatment, and a primer layer containing phosphomolybdic acid as a rust-preventing pigment, formed on the outer surface of the formation film.

10. The coating structure according to claim 9 wherein the aluminum alloy is an Al—Si—Mg-based alloy.

11. The coating structure according to claim 9 wherein the weight of the formation film per unit coated area is from 5 to 30 mg/m$^2$.

12. The coating structure according to claim 11 wherein he weight of the formation film per unit coated area is from 20 to 30 mg/m$^2$.

13. The coating structure according to claim 9 wherein the film thickness of the primer layer is from 5 to 50 μm.

14. The coating structure according to claim 9 wherein the primer layer comprising an epoxy resin as a basic resin added with a rust-preventing pigment made of phosphomolybdic acid.

15. The coating structure according to claim 14 wherein the ratio of the epoxy resin in the primer is from 40 to 60% by weight and the ratio of phosphomolybdic acid in the primer is from 5 to 13% by weight.

16. The coating structure according to claim 9 wherein a topcoat layer is formed on the outer surface of the primer layer and the coating material constituting the topcoat layer is an acrylic resin-base or melamine-base coating material.

* * * * *